United States Patent
DeNatale, Jr.

(10) Patent No.: US 7,222,739 B2
(45) Date of Patent: May 29, 2007

(54) ROTATABLE DISPLAY HOLDER FOR VCR TAPES, DVD'S AND VIDEO GAMES

(75) Inventor: John DeNatale, Jr., 81-17 Beaver Spur, Moriches, NY (US) 11955

(73) Assignee: John DeNatale, Jr., Moriches, NY (US)

( * ) Notice: Subject to any disclaimer, the term of this patent is extended or adjusted under 35 U.S.C. 154(b) by 0 days.

(21) Appl. No.: 11/455,085

(22) Filed: Jun. 16, 2006

(65) Prior Publication Data
US 2006/0284520 A1 Dec. 21, 2006

Related U.S. Application Data

(60) Provisional application No. 60/690,861, filed on Jun. 16, 2005.

(51) Int. Cl.
*A47G 29/00* (2006.01)
(52) U.S. Cl. ........................................................ 211/40
(58) Field of Classification Search ................. 211/163, 211/40, 78, 41.12, 49.1, 131.1, 58, 1.52, 95; 312/9.45, 9.46, 9.9, 9.48, 9.52, 125, 135; D6/407; 206/307, 308.3, 309, 387.1, 387.15, 206/307.1
See application file for complete search history.

(56) References Cited

U.S. PATENT DOCUMENTS

| | | | | |
|---|---|---|---|---|
| 2,899,074 A | * | 8/1959 | Gullixson | 211/40 |
| 3,608,739 A | * | 9/1971 | Duboff | 211/40 |
| 3,692,376 A | * | 9/1972 | McKinsey et al. | 312/9.46 |
| 4,014,437 A | * | 3/1977 | Rumble et al. | 211/4 |
| 4,826,261 A | * | 5/1989 | Nademlejnsky | 312/9.46 |
| 5,031,779 A | * | 7/1991 | Szenay et al. | 211/40 |
| 5,176,264 A | * | 1/1993 | De Palma | 211/40 |
| 5,188,240 A | * | 2/1993 | Marino et al. | 211/40 |
| 5,385,397 A | * | 1/1995 | Chow | 312/9.45 |
| 5,524,775 A | * | 6/1996 | Kaine | 211/131.1 |
| 5,547,085 A | * | 8/1996 | Gaus | 211/40 |
| 5,566,839 A | * | 10/1996 | Muller | 211/40 |
| 5,669,494 A | * | 9/1997 | Geffen | 358/1.15 |
| 5,749,477 A | * | 5/1998 | Chang | 211/40 |
| D404,958 S | * | 2/1999 | Cheris et al. | D6/630 |
| 5,964,356 A | * | 10/1999 | Gareau et al. | 211/40 |

(Continued)

Primary Examiner—Jennifer E. Novosad

(57) ABSTRACT

A rotatable display holder system includes one or more rotatable display holders constructed for stacking upon other rotatable display holders to store and display media items for easy access. The holders are preferably formed by injection molding by common materials to minimize cost. The holders may be formed as round, cylindrical housings, constructed with substantially flat upper and lower disc-like surfaces extending radially from the housing's axial center to create an open internal volume extending from an inner annular wall of the cylindrical housing at a distance R1 from the axial center to an outer edge of the cylindrical housing at a radial distance R2 from the axial center. R2 is determined so that a portion of intended media items extend from the edge of a compartment into which it is placed, and to define an outer boundary of the housing's annular internal volume. A set of vertical dividers arranged on an inner face of at least one of the top and bottom disc-like surfaces, extending radially in a direction from the axial center to define boundaries of media-item storage compartments within the internal volume, and open compartments proximate each media store compartment to facilitate grasping of media items stored in and partially extending from the storage compartments.

13 Claims, 6 Drawing Sheets

U.S. PATENT DOCUMENTS

| | | | |
|---|---|---|---|
| D420,239 S * | 2/2000 | Nemeth | D6/630 |
| 6,149,019 A * | 11/2000 | Newman | 211/40 |
| D438,049 S * | 2/2001 | Demeter | D6/630 |
| 6,206,493 B1 * | 3/2001 | Sanchez-Levin et al. | 312/125 |
| D455,577 S * | 4/2002 | Wilson, Jr. | D6/449 |
| 6,439,406 B1 * | 8/2002 | Duhon | 211/131.1 |
| 6,585,119 B2 * | 7/2003 | Palder | 211/49.1 |

* cited by examiner

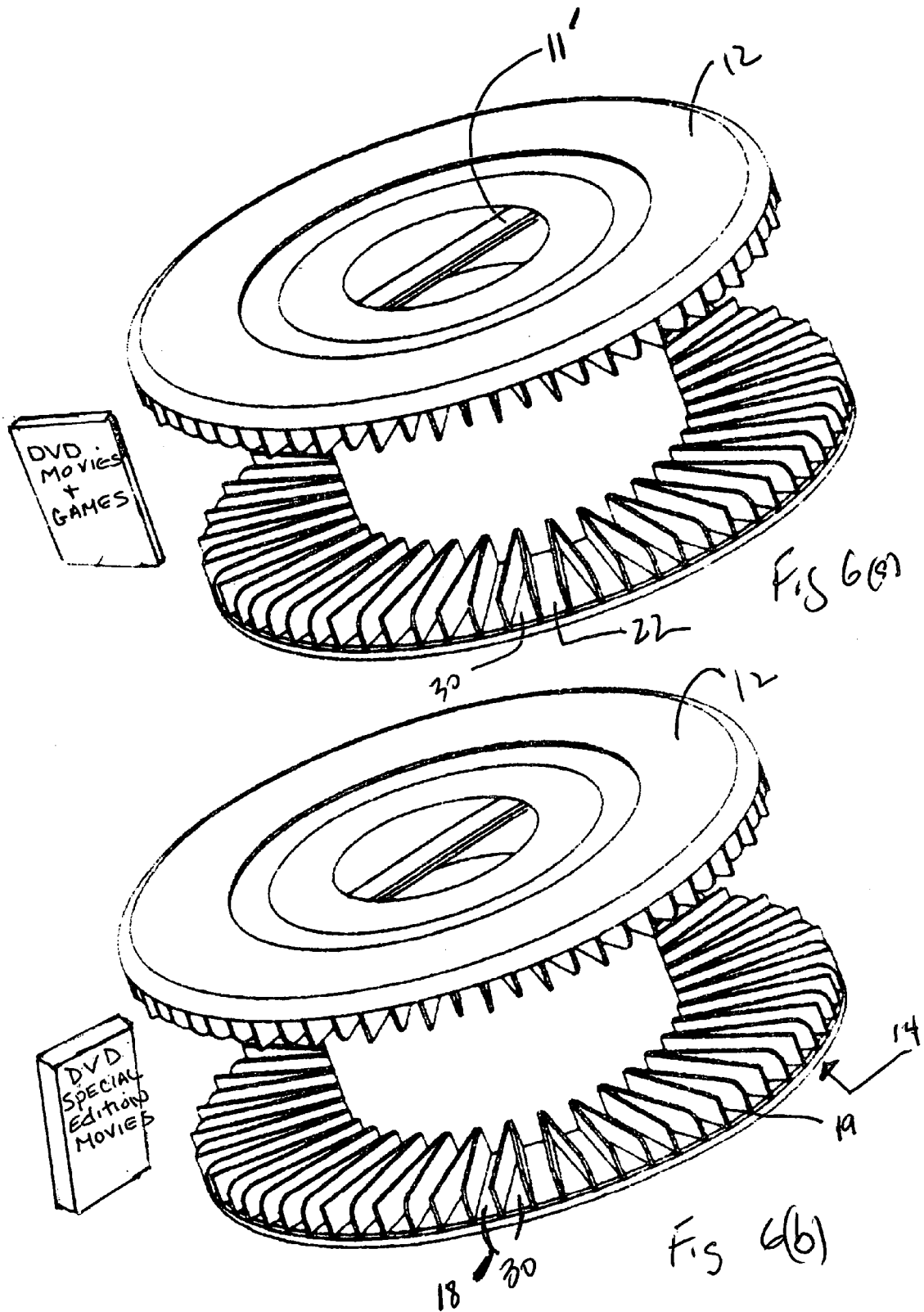

ROTATABLE DISPLAY HOLDER FOR VCR TAPES, DVD'S AND VIDEO GAMES

This application draws its priority from U.S. provisional application No. 60/690,861, filed Jun. 16, 2005.

BACKGROUND OF THE INVENTION

1. Field of the Invention

The present invention relates to a rotatable display system which includes one or more cylindrical rotatable display holders constructed in a preferably injection-molded design, for storing multi-media items in such a way that a user may view the entire contents of a collection of multi-media items by spinning the holder, and easily and readily grasp or insert the media items into compartments within the holder, in a compact, elegant design.

2. Description of the Prior Art

Numerous holders for tape and game holders have been provided in the prior art that are described as follows. Even though these innovations may be suitable for the specific individual purposes to which they address, they differ from the present invention as hereinafter contrasted. The following is a summary of those prior art patents most relevant to the invention at hand, as well as a description outlining the differences between the features of the present invention and those of the prior art.

1. U.S. Pat. No. Des. 404,958, Invented by Cheris et al., Entitled Rotatable Holder For Compact Discs, CD-Roms, and other discs as shown and described.

The design patent to Cheris depicts a rotatable holder for compact discs, CD-roms, and other discs, as shown and described.

2. U.S. Pat. No. 5,566,839. Invented by Muller, Entitled "Stand for Holding Objects of the Same Shape"

In the patent to Muller, a stand for holding compact discs and/or tape cassettes preferably has a rotatably mounted part made up of a multiplicity of bar-shaped elements of two different types. These elements have transverse grooves enabling them to be fitted on the other in parallel pairs, with alternate pairs at tight angles to each other, thus giving two pairs of parallel walls. The elements also have longitudinal ribs located opposite each other, thus providing lateral supports for the objects. The individual components can be provided as a kit which enables the stand to be transported and distributed in unassembled form. A second, smaller part can be mounted on the first and connected to it. This second part is designed to hold differently shaped objects.

3. U.S. Pat. No. 5,188,240, Invented by Marino et al., Entitled "Storage Unit For Recording Media Boxes"

The Marino invention describes a storage unit or rack for recording-media boxes such as CD boxes or other such containers which rack supports the boxes in a series of parallel substantially horizontal planes or in planes inclined at some other angle. The rack has one or more pairs of sidewalls lying in planes which intersect at right angles and which engage two adjacent side edges of each box and leave the other two side edges of each box facing outwardly and exposed so that they are visible for reading labels on the boxes and to provide easy access for placement and removal of such boxes.

4. U.S. Pat. No. 5,749,477, Invented by Chang, Entitled "video/Audio Medium Rack"

The patent to Chang describes a vide/audio medium rack at least including four connecting rods, four wall boards and a back board. The wall boards are disposed with tenons interlacedly engaged with engaging slots of the connecting rods so as to assemble the wall boards with the connecting rods. The back board is formed with peripheral stopper edge for fitting into channels of the wall boards so as to assemble the back board with the wall boards. CDs and VHS tapes can be both rested in the rack. Several racks can be stacked or assembled to enlarge the capacity of the rack. A base is disposed under the bottom of the rack and rotatably fitted with a bottom dish, whereby the base together with the rack can be rotated relative to the bottom dish.

5. U.S. Pat. No. 5,385,397, Invented by Chow, Entitled "Stackable Compact Disc Carousel"

In the patent to Chow, a stackable storage rack receives thin flat objects such as compact disc cases. The rack includes a turntable wit radially extending grooves for receiving the objects. The base has portions thereof extending radially outwards beyond the turntable. There is a spindle and bearing for rotatably mounting the turntable on the base. A plurality of elongated rods extend perpendicularly from the top of the base on the portions thereof. There are sockets on the bottom of the base for releasably receiving tops of the rods of another rack. A plurality of racks can thereby be stacked one upon the other.

6. U.S. Pat. No. Des. D438,049, Invented by Demeter, Entitled "Combined Storage and Automatic Retrieval Apparatus for Recorded Media"

The design patent to Demeter depicts the ornamental design for a combined storage and automatic retrieval apparatus for recorded media, as shown and described.

7. U.S. Pat. No. Des. D296,297, Invented by Hardy, Entitled "Rotatable Merchandising Display Stand"

The design patent to Hardy depicts the ornamental design for a rotatable merchandising display stand as shown and described.

8. U.S. Pat. No. Des. 420,239, Invented by Nemeth, Entitled "Zip Disc Tower"

The design patent to Nemeth depicts the ornamental design for a Zip Disc Tower, as shown and described.

9. U.S. Pat. No. Des. D434,239, Invented by van den Branden, et al., Entitled "Storage Box"

The design patent to van den Branden, et al., depicts the ornamental design for a storage box, as shown and described.

10. U.S. Pat. No. 6,149,019, Invented by Newman, Entitled "modular Library System (Compact Disc Housing Unit)"

In the patent to Newman, a modular library system, compact disc holder comprises a main housing unit with a lower plate, an upper plate, a pair of opposing side walls, and a rear wall. In addition, the main housing includes an inner retractable plate. Mounted on the inner retractable plate is an inner unit, with a turntable in between, allowing for 180 degree rotation when the inner retractable plate is fully extended. Accordingly, the inner retractable unit is comprised of a lower plate, an upper plate, a pair of opposing side walls, and two inner walls parallel to the opposing side walls. Housed within the inner unit are six individual smaller units, which have a series of elongated ribs, providing storage slots for CDs. Each of these six individual smaller units can be removed and relocated as desired. The dimensions of the compact disk housing unit were designed to fit into the bottom of most stereo rack systems, although it may stand alone as well.

11. U.S. Pat. No. 5,031,779, Invented by Szenay, Entitled "Compact Disc Storage Carousel"

The patent to Szenay describes a carousel for storing and displaying compact disk albums or cases comprises one or more reels rotatably mounted on a turntable base where the reels include a central core and a pair of parallel spaced-apart disks having sets of parallel ribs disposed at equal angular positions around the core. The dimensions are such that the CD case readily fits between the pair of disks and are held upright by their engagement with the fibs formed on the disks. When a reel populated with a plurality of CD cases is placed on the base, it may be rotated so as to bring the cases into view for selection of a particular recording for play.

Generally, the prior patents illustrate various tape and disk holders, including: rotatable holders in a "tower" like shape with complex constructions and parts; holders for small audio cassette tapes no conducive to injection molding processes; holders that are small and portable that have various elements for actually "holding" items; various holders that do not rotate; and various merchandise display racks for usage in store and retail outfits.

Unlike the above, the present invention is a rotatable display system, including at least one rotatable display holder ("holder"). The holders are stackable for compact storage of large numbers of media items, as defined and used herein. The holder construction is cylindrical, with an axial center from which extends top and bottom disc-like surfaces, forming an open and accessible internal cylindrical volume. The internal volume is divided to realize media item compartments for insertion/extraction of media items, and empty compartments or openings on either side. The media-item compartments are preferably constructed so that its length (radial length) is less than the "insertion length," or actual length of the media item, which supports that the user can readily grasp/insert, in a convenient and comfortable manner, any media item for storage and retrieval.

When used herein, or in the claims, media item should be understood to mean any type of rectangular object relating to media, such as containers holding computer-readable media such as CD's, or DVD's, or some combination of CD's and DVD's or VCR tapes, or boxes for VCR tapes, or some combination of VCR tapes, and DVD's or VCR and CD, or a combination of the three, or video games, hooks, etc., or some combination of any media item mentioned, or any media item known to those skilled in the art (hereinafter referred to broadly as "media items").

The holders may include multiple sleeves or dividers to support definition the media-item compartments and open compartments to divide the internal volume. The dividers may be fixed in the slots or grooves, or may be slideable, or flexible, preferably a divider portions proximate outer portions of the holder construction. The dividers are preferably durable plastic material. Moreover, each holder of the rotatable display system rotates about its bottoms surface, which is constructed for stacking upon holder top surfaces. The media items are preferably stacked in the adjustable-sized compartments such that the user can easily read the title of each on the spine of the item. The holders may be constructed to include handles for carrying, and for stacking one upon another in order to store, and provide for the ready and convenient retrieval of the stored media items in an aesthetically pleasing manner.

SUMMARY OF THE INVENTION

As noted above, the present invention includes, among other things, a rotatable display system comprising rotatable display holders for storing media items such as VCR tapes, DVD's, video games, CD's, in compartments formed in an internal volume of the holders.

The rotatable display system includes one or more cylindrical rotatable display holders constructed in a preferably injection-molded design, for storing multi-media items. One feature of the inventive construction assures that a user may view the entire contents of a collection of multimedia items by spinning the holder, and easily and readily grasp or insert the media items into compartments within the holder, in a compact, elegant design.

The rotatable display holder ("holder") is cylindrical with an axial center from which extends top and bottom disc-like surfaces. The construction forms an open and accessible internal cylindrical volume divided in such a way that there are compartments for insertion/extraction of stored media items, with openings or open compartments on either side. The compartments are preferably constructed so that the radial length of the media-item storage compartments is less than the "insertion length" of the media item. The inventive holder and rotatable holder systems provide that the user can readily grasp/insert, in a convenient and comfortable manner, any media item for storage and retrieval.

The holders may include multiple sleeves or dividers to support definition the media-item compartments and open compartments to divide the internal volume. The dividers may be fixed in the slots or grooves, or may be slideable, or flexible, preferably at divider portions proximate outer portions of the holder construction. The dividers are preferably durable plastic material, and are rotatable about their bottom surfaces. The bottom surfaces are constructed for stacking upon holder top surfaces. The holders may be constructed to include handles for carrying, and for stacking one upon another in order to store, and provide for the ready and convenient retrieval of the stored media items in an aesthetically pleasing manor.

When used herein, or in the claims, media item should be understood to mean any type of rectangular object relating to media, such as containers holding computer-readable media such as CD's, or DVD's, or some combination of CD's and DVD's, or VCR tapes, or boxes for VCR tapes, or some combination of VCR tapes, and DVD's, or VCR and CD, or a combination of the three, or video games, books, etc., or some combination of any media item mentioned, or any media item known to those skilled in the art (hereinafter referred to broadly as "media items").

In one embodiment, the holder(s) are constructed as cylindrical structures (preferably injection-molded) that include an axial member defining a cylindrical central axis, from which round, substantially disc shape surfaces extend. An annular wall defining an inner dimension of the internal volume of the cylindrical structure is found at a distance R1 from the axial center.

While open, the internal volume is defined by the distance between surfaces (height), and the difference between the outer contained edge, at distance R2 from the axial center, and R1. Vertical dividers may be included between the inner faces of the top and bottom surfaces to extend radially from the axial center separating the internal volume into separate spaces or compartments to receive the media items. In this embodiment, the dividers may slide left or right to adjust the volume or shape of a compartment formed with the divider(s). This way media items may be easily inserted and removed. The dividers may extend from the axial center, to a position near, a position at, or a position in radial extension beyond the edge of the top, or bottom surfaces. The dividers may merely separate an outer portion of the distance from the radial center to the edge.

Alternatively, there may be an annular wall at a first radial dimension R1 of the holder (the dividers are not attached or formed to extend from the axial center), to which the dividers are attached, or formed as part of the structure by an injection-molding process, wherefore the dividers extend from R1 to an outer radial dimension R2 at the edge of the holder. The reader should note, however, that the dividers shown are situated in fixed slots, and have a fixed size, so must be quite flexible for sufficient comfortability for a user to move aside the divider with his/her fingers to grasp a media item placed therein. The invention contemplates that an empty compartment on at least one side of compartment should not contain a media item to allow for the intrusion into that compartment to facilitate placement and grasping.

The invention does not require the slots or grooves for insetting the dividers, but should be included in embodiments where the dividers are movable, for insertion into various slots or grooves to vary the size of the compartments, and empty compartments or openings. In this way the user can adjust the storage compartments to accommodate various-sized, and unconventionally-sized media items. Fixed media-item compartment size, or fixed number of compartments in a particular adjustable embodiment of the invention is not necessary as long as the dividers effectively and adjustably separate media items in the holder, and allow the user to effectively and efficiently, and comfortably grasp a stored media item, or insert an item for storage.

This arrangement provides that the individual dividers can slide into the upper and lower grooves, or tray be vacant from a groove giving the user even greater flexibility in defining his/her compartment sizes (volumes), particularly if attempting to store a non-standard size media item. Once a media item is inserted into a holder in a rotatable holder system, the user can easily read the title of each on the spine of the item. The compartments are flexible, not just for the ability to utilize or not utilize dividers in the slots or grooves, but the dividers themselves, because constructed with preferably flexible plastic, provide some "give" so that the user can easily place his or fingers round the media item. e.g., tape or DVD, etc., to conveniently pull the item from the holder.

In another embodiment, the holders may include dividers that are part of, and extend from surfaces in the holder construction. The "fixed" vertical dividers may or may not extend to full height of the compartment to be contiguous with the inside surface of the top cover, or any full length. There are limited only by their primary function, which is to divide the internal volume. As such, an aspect of the invention is to hold media items of different sizes, including CD's, DVD' movies and games, and VCR tapes, all of varying width and sizes. There is no set size, or set arrangement. The user can slide in all VCR tapes, or all CD's, or all DVD's (DVD movies, DVD games, DVD or CD computer software), or some combination thereof. The rotatable holder is perfect for a mish-mosh of various sized media items, because its inventive construction allows it to hold whatever is convenient, as long as it allows easy accessibility of the contents of the holder or holder system by merely spinning the rotatable holder (like a lazy Susan), but being able to readily grasp the media item. The holders are stackable, and may be placed in a cabinet wall unit or entertainment center.

The rotatable holder may be produced in several sizes. The holders can be stacked on top of one another to hold a large collection of tapes, DVD's and games. In addition, the rotatable holder may be motorized. The motorized rotatable holder system may be remotely control controlled. This allows the user to spin the holder to easily locate a particular item contained within. Finally, specialized cabinets may made for the rotatable holder, providing a compact means to hold a variety of items in an attractive manner.

Accordingly, it is an object of the invention to provide a rotatable system that includes rotatable display holders that effectively hold any media items in a space-saving manner, and which allows versatility in the user's storage arrangement, in view of stackability of the holders, in a light weight, a readily manufacturable plastic construction. The invention envisions that any divider used to divide internal volume into compartments is flexible, and slideable or movable about the surface or surfaces to realize adjustable compartment or slot sizes. That is, the holders may be made in one piece by injection molding, so costs are low and the rotatable holder system may be marketed at a very low price, and the stackable design.

Another object is to provide a system and holder that is manufactured of lightweight, relatively inexpensive material, functioning to keep manufacturing and shipping costs to a minimum, and each holder includes a handle. Preferable the handle is recessed into the top surface of the holder including the handle.

Furthermore, it is a goal of the present invention to provide a system or holder that is manufactured in any size, to contain any combination of media items in various numbers, for example, holders constructed in small and large sizes.

It is an additional goal of the invention to provide a system or holder that can include graphics thereon, as well as many colors thereon.

It is therefore an object of the invention to realize a rotatable display holder system includes one or more rotatable display holders constructed for stacking upon other rotatable display holders to store and display media items for easy access. The holders are preferably formed by injection molding by common materials to minimize cost. The holders may be formed as round, cylindrical housings, constructed with substantially flat upper and lower disc-like surfaces extending radially from the housing's axial center to create an open internal volume extending from an inner annular wall of the cylindrical housing at a distance R1 from the axial center to an outer edge of the cylindrical housing at a radial distance R2 from the axial center. R2 is determined so that a portion of intended media items extend from the edge of a compartment into which it is placed, and to define an outer boundary of the housing's annular internal volume.

A set of vertical dividers arranged on an inner face of at least one of the top and bottom disc-like surfaces, extending radially in a direction from the axial center to define boundaries of media-item storage compartments within the internal volume, and open compartments proximate each media storage compartment to facilitate grasping of media items stored in and partially extending from the storage compartments. The dividers are preferably flexible plastic, in order that they flex or slide with applied force by a user in order to access media items which may be stored therein.

It is another object of the invention to provide a rotatable holder that may be powered and remotely controlled, allowing the user to cause the holder to rotate to view all contents thereof.

Finally, it is an important goal of the present invention to provide media-item holders that can be easily stacked on top of one another, providing the user with a convenient means to store au entire collection of movies and games in a compact manner. Where the holders are injection molded, limitations may be imposed, but should not limit the breadth and scope of the inventions as claimed broadly. For example, the cylindrical housing, including dividers in whatever form and structure implemented to realize storage and non-storage spaces or compartments, is preferably formed as one structure, where rotate means is constructed separately to be attached to the housing for rotating operation.

The novel features which are considered characteristic for the invention will be set forth in the claims when submitted. The invention itself, however, both as to its construction and it method of operation, together with additional objects and advantages thereof, will be best understood from the description of the embodiments to be submitted when read and understood in connection with drawings relating thereto.

BRIEF DESCRIPTION OF PREFERRED EMBODIMENTS

DETAILED DESCRIPTION OF THE PREFERRED EMBODIMENTS

Figure 1:
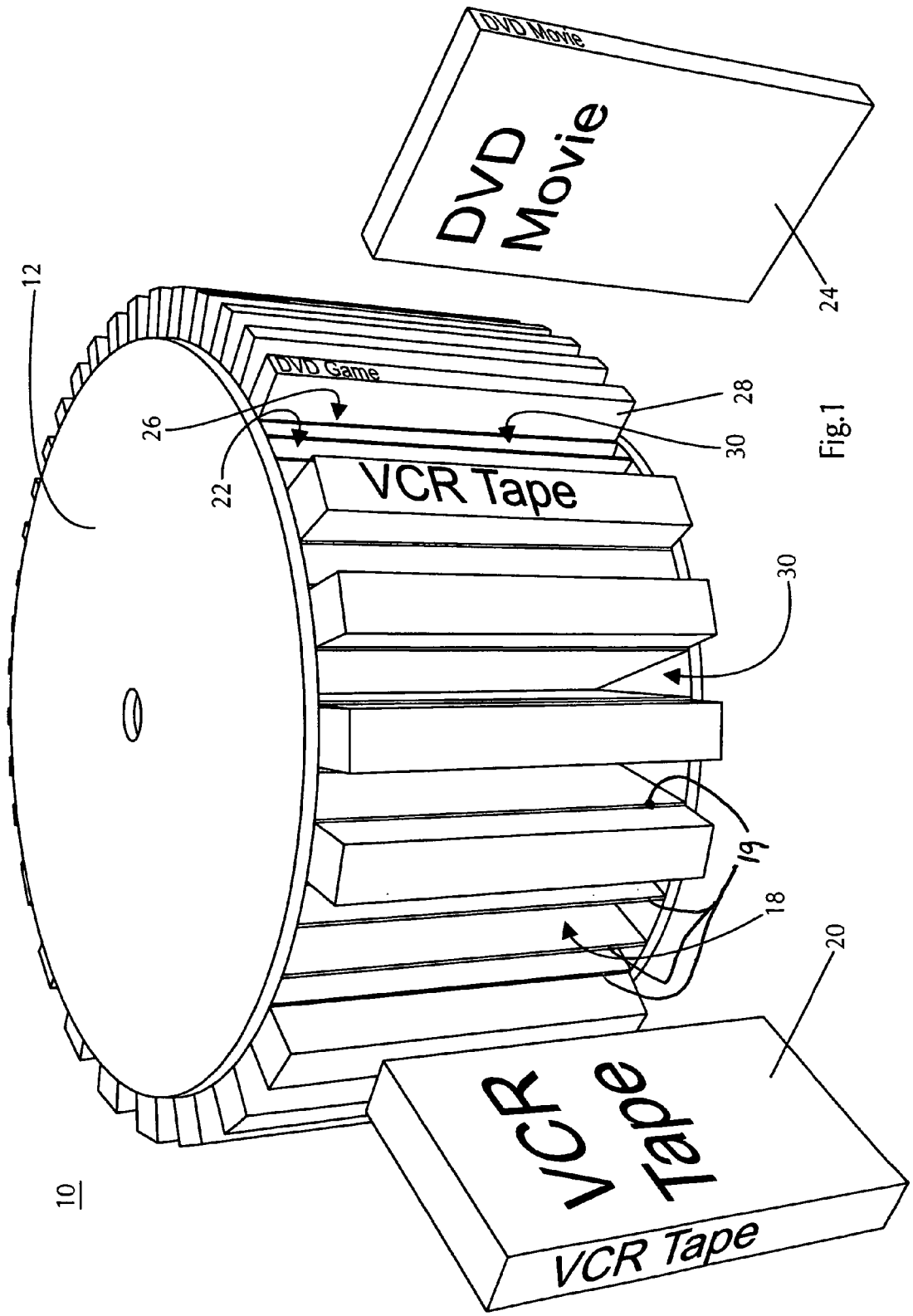
FIG. 1 is a three-quarter upper perspective view of the present invention, illustrating the principal components, shown for the purposes of example only.
Figure 2:
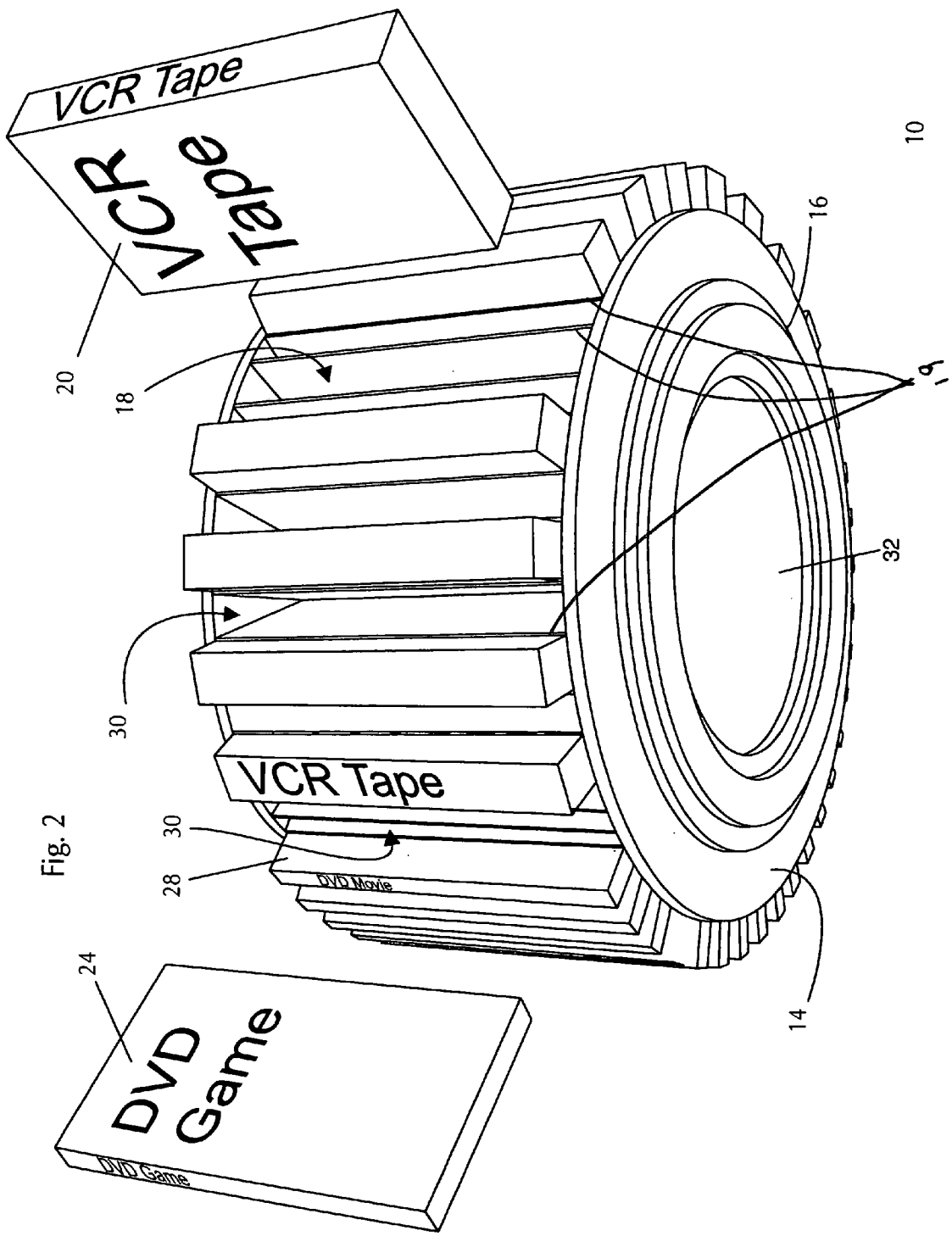
FIG. 2 is a three-quarter lower perspective view of the present invention, illustrating the principal components, including the rotatable assembly, shown for the purposes of example only.

FIG. 1 is a three-quarter upper perspective view of the one embodiment of the present invention, illustrating the principal components of the embodiment, only, shown for the purposes of example only. FIG. 2 is a three-quarter perspective view of a bottom portion of a holder of the present invention. The figures together illustrate the principal components of this embodiment, including the stackable nature of each holder, the rotatable nature of each holder, and the readily protruding media-items with side access as shown.

The single rotatable display holder is shown in the FIGS. 1 and 2 embodiment is constructed to provide rotatable storage for media items such as VCR tapes. DVD videos, and DVD game holders (1), etc., in such a way that the media items are readily identifiable in a fixed position in the holder, protrude from the internal volume in such a way that, coupled with the open spaces on the sides of each media-item containing compartment, allows a user easy access to insert and remove media items to/from the compartments. The embodiment of the inventive display holder so described is round or cylindrically shaped and comprises a substantially flat top member or surface (12), a substantially flat base member or bottom surface (14), a rotatable assembly (16) located under the bottom surface (14). The holder also includes first multiple media-item compartments (18) on a first side, which each may hold a VCR tape (20). For exemplary purposes, the embodiment is shown also to include second multiple media-item compartments (22), on a second side, which each hold a DVD movie (24). Again for exemplary purposes, the embodiment is shown to have third multiple media-item compartments (26), which compartments each hold a DVD game (28).

As should be readily apparent, the inventive holder includes multiple open or non-occupied spaces or compartments (30) disposed between the media-item compartments to hold the media items, separated by a vertical dividers 19 of a set of vertical dividers positioned about one or both surfaces and extending radially with respect to the axial center. The reader should note that while the embodiment depicts dividers 19 in a functional form as shown as solid contiguous wall-like structures, any form of a divider, vertical, partial, or otherwise, which allows for fixed or adjustable separation of compartments within the internal or annular volume comprising the holder, as understood by the skilled artisan may be used without departing from the scope or spirit of the invention.

The designation of compartments 18, 22 and 26 for storing particular media items, such as VCR tape 20, DVD movie 24 and DVD game 28, separately with only one type media item, or a mixed fare of media items, are for example only. That is, compartments 18, 22 and 26 may be constructed to store all VCR tapes, or all DVD movies, or all DVD games, or any combination of the media items, and are only shown in the particular embodiments to give the reader a "feel" for the functional nature of the compartments, and the relationship between the open or non-occupiable compartments, and the media-item containing compartments. The only limitation for any storage compartment for use herein is that it have a length that is less than the media item, and preferably one inch less, and include open compartments or spaces on either side or the compartment defined by the divider or dividers, to allow the user finger space allotted thereby to easily and readily grasp same item.

The extra space provided between stored media items allows a user to conveniently place his or her fingers between the tapes or games to grab the same and pull them out of the compartments with ease. For that matter, the radial dimension which defines the radial length of the media-item compartment must always be less that the length of the media item intended for insertion and storage in said compartment, in order that some portion of the media-item extends or protrudes beyond the cylindrical edge of the internal housing volume, further facilitating easy and ready insertion and retrieval of media items.

When used herein, or in the claims, media item should be understood to mean any type of rectangular object relating to media, such as containers holding computer-readable media such as CD's, or DVD's, or some combination of CD's and DVD's, or VCR tapes, or boxes for VCR tapes, or some combination of VCR tapes, and DVD's, or VCR and CD, or a combination of the three, or video games, books, etc., or some combination of any media item mentioned, or any media item known to those skilled in the art (hereinafter referred to broadly as "media items").

In general, the holder may be manufactured in any of a variety of durable materials that accomplish the purposes of the invention. Preferably, the holders are constructed of a durable plastic material by an injection molding process, which is envisioned by the inventor hereby. The surfaces of the holder are designed to facilitate injection-mold production, by the inventions' simple, elegant design. Each of the compartments (18, 22, 26), or any other compartments to embody alternative embodiments to those shown and described herein are intended to be constructed with dimensions that qualify an intended media item to be stored in a particular component, including defining each media-item compartment width such that it will readily accept deposit of, and ready retrieval of, media items, e.g. VCR tapes, DVD movies, games, etc., using only gravity and an accurate fit widthwise and height wise.

That is, the holder designs stay within the scope and spirit of the inventions as claimed if the each media-item compartment is constructed to be vertically oriented, and preferably adjustable at its flexible opening to receive media items, and provide the user with an ability to read on the spines of media items inserted therein. Compartments (18) as shown are of a width approximately 1¼ inches, and of sufficient depth to allow portions of the VCR tapes inserted therein to extend beyond the periphery of the housing up to one (1) inch. A second compartment size for such embodiments (22, 26) is depicted having a width of approximately ¾ inches, an of a sufficient depth to allow portions of the DVD's and video games inserted therein to extend beyond the periphery of the housing, up to one (1) inch.

Because the bottom (14) of the holder (10) is equipped with a rotatable assembly (16), the entire housing may be easily rotated by the user to display all contents of the holder. Such rotatable assembly (16), in the embodiment shown, comprises multiple annular members which function to both engage the holder flat bottom surfaces or bases, and to allow the user to spin the holder freely either manually or automatically (if the rotatable assembly is motor driven). In a simpler form, the rotatable assembly may comprise a base member that the holder is positioned, whereby the holder is able to be spinned about its central axis by force from a users hand(s).

While as mentioned above, the media-item compartments in the example (18, 22, 26) are of sufficient depth to allow portions of the media items inserted therein to extend beyond the housing, they are also sufficiently spaced apart from one another to create spaces therebetween (30). Such spaces (30) allow the user to easily place the user's fingers around the media item to pull it from the holder. It should be noted that the rotatable holders (10) may be manufactured in a variety of sizes to hold varying quantities of media items. The FIG. 3 holder (10) is small in nature and comprises media-item compartments to hold 11 DVD's and 11 VCR tapes. For the purposes of example, this small embodiment may be of a diameter of approximately 20 inches, with a height of approximately 8½ inches.

In the next embodiment, the holder (10) is large in nature and comprises compartments to hold 16 DVD's and 16 VCR tapes. For the purposes of example, this small embodiment may be of a diameter of approximately 20 inches, but may still be of a height of approximately 8½ inches. In another embodiment, the holder may be small in nature and designed to hold only VCR tapes, and in a fourth embodiment the holder may be large in nature and designed to contain only VCR tapes, such as a quantity of 30 total VCR movies. Likewise, in yet another embodiment, the holder may be small in nature and designed to hold only DVD's, and in still yet another embodiment, the holder may be large in nature and designed to contain only DVD's.

Figure 3:
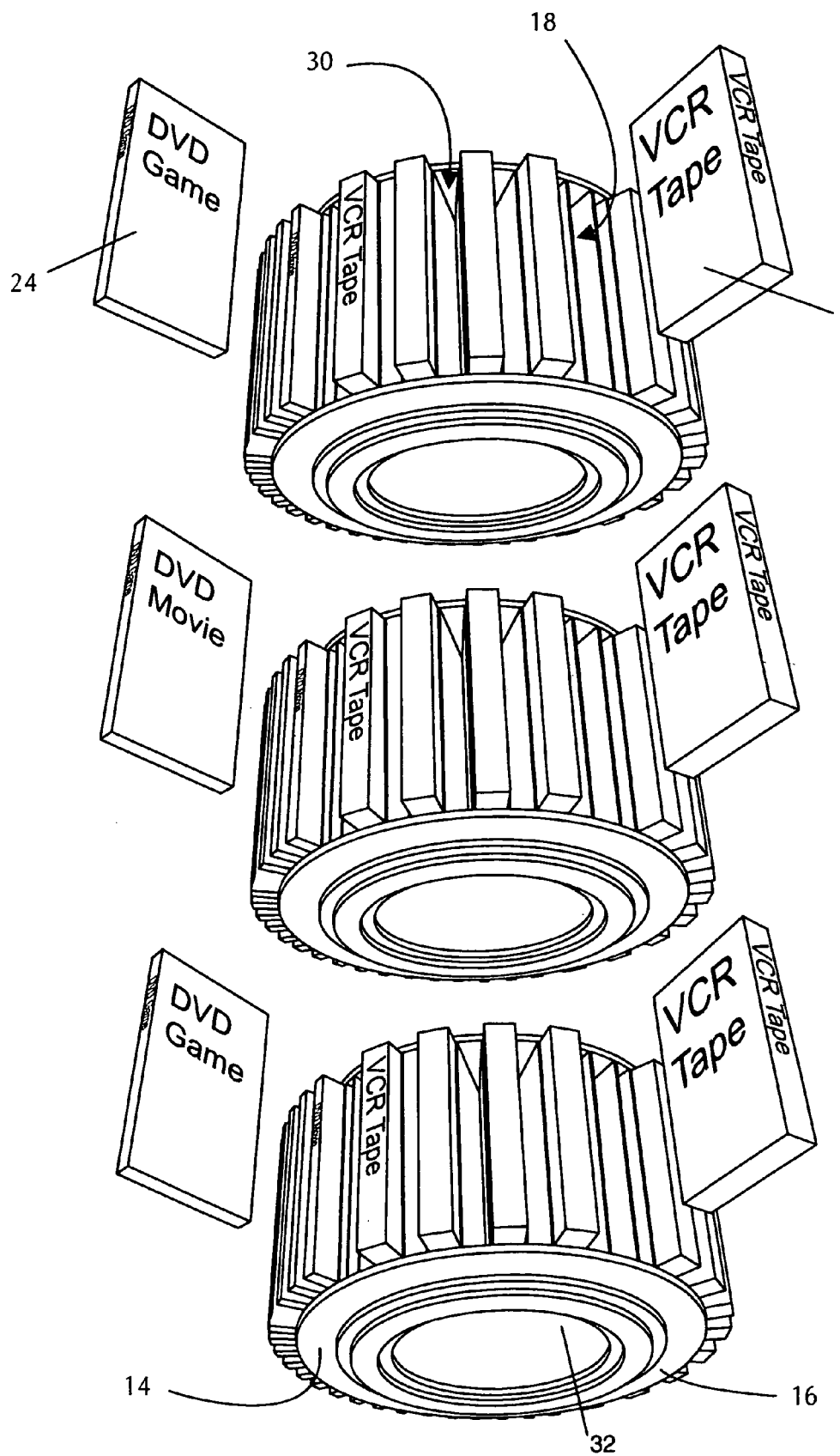
FIG. 3 is an exploded lower view of multiple rotatable display holders stacked atop one another, including the location of the motorized means for the purposes of example.

Importantly, in each of the above examples, the holders may be designed to be stackable atop one another and rotate. For example, as illustrated in FIGS. 3 and 4, two or more identical holders may be stacked atop one another such that users with large collections in the form of a single media can conveniently store their entire collection with such holders.

Similarly, users with collections that include a mix of media items, such as VCR tapes, DVD movies and DVD games, may stack different embodiments of the present invention atop one another, such that the user can store and display their entire multi-media collection through usage of the holders.

Moreover, unlike the holders of the prior art, the rotatable holder of the present invention can hold a mix of media items, such as VCR tapes and DVD's or games, saving a great deal of space for the user. In fact, the rotatable holder can the placed in a cabinet with shelves for VCR's or DVD players, as well as in a wall unit or entertainment center. Such cabinets may be specially manufactured for usage in conjunction with the holders of the present invention, such as by including sufficient width and height for several such holders to be placed therein.

Figure 4:
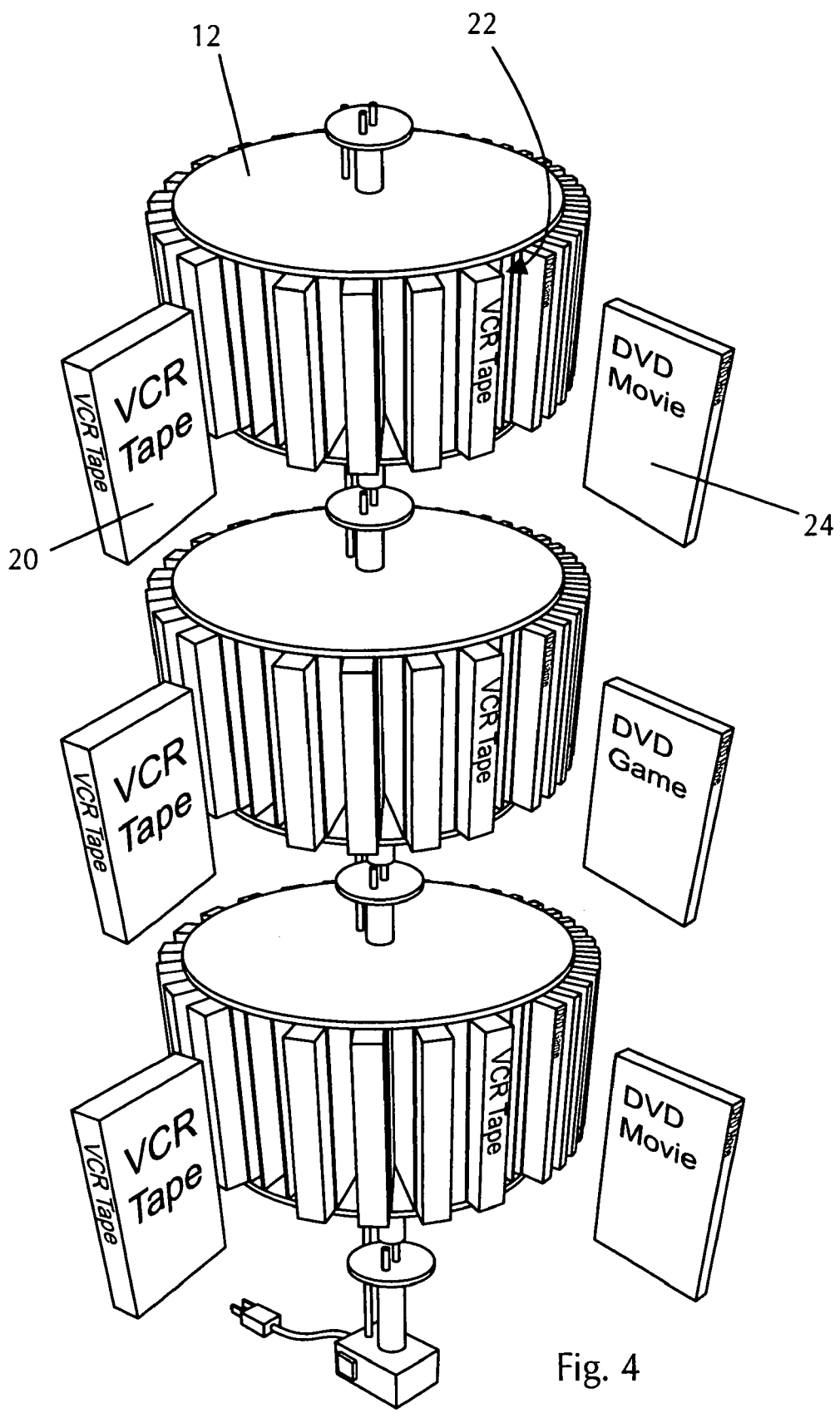
FIG. 4 is an exploded upper view of multiple rotatable display holders with adjustable openings stacked upon one another, including the location of the motorized means, for the purposes of example.

Regarding further versatility of the present invention, the rotatable display holder for media item storage, such as VCR tapes, DVD's, and video games, may be motorized, as illustrated in FIG. 4. In such an instance, the holder may be remotely controlled, allowing the user to cause the holder to automatically rotate to a previously determined degree, to allow a user to easily locate a particular item contained within.

In addition, in an enhanced alternate version, the rotatable display holder with adjustable openings may be customized by a user and able to be adapted to a user's particular needs. Such may be accomplished by the user inserting dividers in the multiple, available slots to create compartments of a desired size. For that matter, rectangular sleeves may be arranged between dividers, defining a media-item compartment by the sleeve, and opening on both sides bounded by the dividers. Fixed vertical dividers may be implemented in the inventions by embodiment shown in FIGS. 5(a) and 5(b). Grooves or other structure are arranged on the top and bottom flat or disc-like members 12 and 14, upon which dividers 36 extend. The dividers 36 can be made of any suitable material for forming a wall between two pieces of media (i.e., DVD, VCR tape) such as plastic, paper, wood composite, cardboard, etc., while grooves can be used to hold the dividers in place, any means for holding the dividers can be used, such as pins, screws, nails, dowels rods or buttons, etc. For the purposes of example, a user may have 20 VCR tapes and 6 DVD's, and then be able to reconfigure the rotatable display holder accordingly. As such, the device may comprise many slots, and may come with a supply of appropriate panels.

Figure 5A:
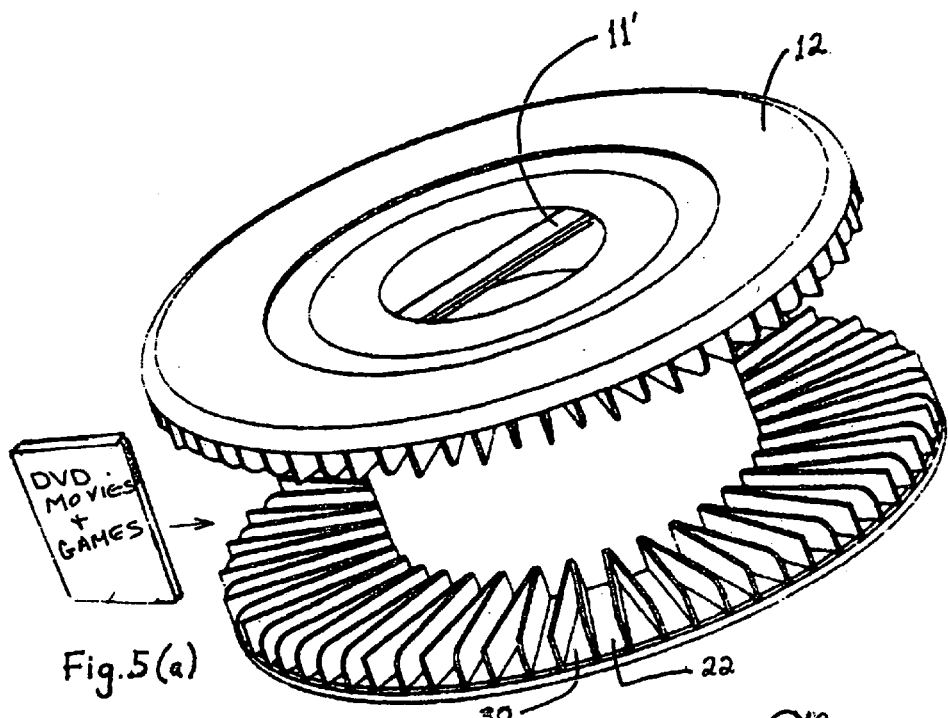
FIG. 5(a) is another embodiment of a rotatable holder system of the present invention constructed to store exclusively DVD items, or containers sized accordingly, shown for the purposes of example only.

The grooves or other means for holding the dividers can be arranged in a spoke or radial pattern as shown in FIG. 5(a). FIG. 5 (a) is not drawn to scale. If the means for securing the dividers, or sleeves, such as the grooves exemplified in FIG. 5(a), in place, function to do just that, they may take any form known to the skilled artisan to include dividers in fixed positions, to provide compartments of specified size. Accordingly, other arrangements can be used to functionally divide the space, as long as part of the media item extends or protrudes beyond the edge of the holder, and there are spaces for finger access on either side of portion of the media item protruding therefrom (or inserted into). For example, arrangements may be implemented where the grooves, etc. are arranged to provide a constant width for the media, so that compartments have a square or rectangular bottom and top.

Figure 5B:
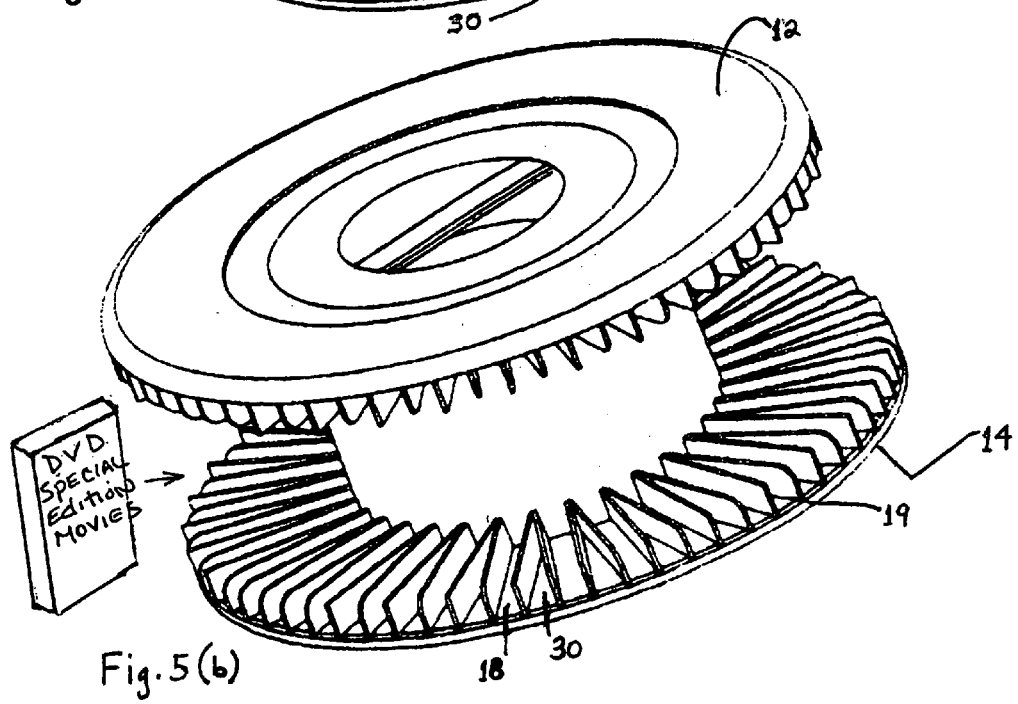
FIG. 5(b) is another embodiment of a rotatable holder system of the present invention to store exclusively VCR tapes, or containers, shown for the purposes of example only.

FIG. 5(b) depicts an embodiment of a rotatable holder as described herein. Further including a handle 11. Alternatively, the handle may be detachable, or recessed. To that end, FIGS. 5(a) and 5(b) show embodiments that include recessed handles 11', and vertical dividers 19 attached or extending from the inside surfaces of the top and bottom disc-like surfaces comprising the holder. While the inner surfaces of the top and bottom surfaces are preferably substantially planar, and sic-like, the outer surfaces of same are not limited to flat and disc-like, but may be more rounded to support a more aesthetically pleasing nature of the holders, and holder systems.

Therefore, in total, the present invention provides a unique means to conveniently store collections of a variety of movies and games in a compact and aesthetically pleasing manner that provides users with ready insertion and access to media items stored therein.

With regard to all descriptions and graphics, while the invention has been illustrated and described as embodied, it is not intended to be limited to the details shown, since it will be understood that various omissions, modifications, substitutions and changes in the forms and details of the device illustrated and in its operation can be made by those skilled it the art without departing in any way from the spirit of the invention.

Without further analysis, the foregoing will so fully reveal the gist of the present invention that others can readily adapt it for various applications without omitting features that, from the standpoint of prior an, constitute essential characteristics of the generic or specific aspects of this invention. What is claimed as new and desired to be protected by Letters Patent is set forth in the appended claims.

What is claimed is:

1. A display holder system comprising one or more display holders for the storage of media items therein, each holder comprising:

a round, cylindrical housing comprising substantially flat upper and lower discs each having an inner and outer face whereby the inner faces are parallel to one another, are separated by a distance defining a height and connected together by a vertically extending cylindrical column; the inner face of each disc opposing each other to create an open internal volume whereby the volume extends between the inner faces of the discs and between an outer wall of the column and an outer circumferential edge of the discs;

a set of vertical dividers arranged on the inner faces of each of the upper and lower discs such that the dividers on the discs are vertically aligned with one another; the dividers on the inner face of the upper disc extending vertically downward a distance less than the height of the housing and having a first surface; the dividers on the inner face of the lower disc extending vertically upwards a distance less than the height of the housing and having a second surface such that the first and second surfaces are separated by a distance and opposing each other; each of the dividers extending between the outer wall of the column and the outer circumferential edge of the discs; adjacent dividers on each of the discs define a space therebetween comprising a compartment;

wherein items are inserted into the holder such that an upper edge of the item is adapted to fit within the compartment on the upper disc, a lower edge of the item is adapted to fit within the compartment on the lower disc, a first proximal side of the item is adapted to be disposed adjacent or abutting the outer wall of the column, and a second distal side of the item is adapted to extend beyond the outer circumferential edge of the discs.

2. The display holder system of claim 1, comprising at least two holders such that the holders can be stacked one on top of the other.

3. The display holder system of claim 1, wherein each divider is stationary and fixed and integrally formed with the respective disc.

4. The display holder system of claim 1, wherein each divider is constructed of a flexible plastic material.

5. The display holder system of claim 1, wherein the dividers and the respective disc are injection molded.

6. The display holder system of claim 1, wherein the outer surface of the upper disc comprises a recessed handle.

7. The display holder system of claim 1, wherein the system includes a motor which allows rotation of the holder.

8. The display holder system of claim 7, wherein the motor is controlled by a remote control.

9. The display holder system of claim 1, wherein the items can be selected from the group consisting of DVD's, DVD movies, DVD cases, DVD holders, CD's, CD cases, CD holders, VCR tapes, VCR tape holders, electronic games, electronic game cartridges, media holders, tape holders, and material related materials.

10. The display holder system of claim 1, in combination with at least one item selected from the group consisting of DVD's, DVD cases, DVD holders, special edition DVD movies, CD's, CD cases, CD holders, VCR tapes, VCR tape holders, electronic games, electronic game cartridges, media holders, tape holders, and other media related materials.

11. The display holder system of claim 1, wherein the housing is made from plastic.

12. The display holder system of claim 1, wherein the holder is rotatable.

13. The display holder system of claim 1, wherein the holder can hold only DVD's, only DYD cases, only DVD holders, only special edition DYD movies, only CD's, only CD cases, only CD holders, only VCR tapes, only VCR tape holders, only electronic games, only electronic game cartridges, only media holders, or only tape holders.

* * * * *

UNITED STATES PATENT AND TRADEMARK OFFICE
CERTIFICATE OF CORRECTION

| | | |
|---|---|---|
| PATENT NO. | : 7,222,739 B2 | Page 1 of 1 |
| APPLICATION NO. | : 11/455085 | |
| DATED | : May 29, 2007 | |
| INVENTOR(S) | : John DeNatale, Jr. | |

It is certified that error appears in the above-identified patent and that said Letters Patent is hereby corrected as shown below:

Col. 12 line 34 in claim 9 says
<u>material</u> related materials. It should read <u>media</u> related materials.

Please change material to media.

Signed and Sealed this
Twenty-eighth Day of December, 2010

David J. Kappos
*Director of the United States Patent and Trademark Office*